United States Patent [19]

Williams

[11] 4,301,354
[45] Nov. 17, 1981

[54] METHOD OF MAKING FOIL TERMINATION FOR A CAPACITOR

[75] Inventor: Ronald L. Williams, Hawthorne, Calif.

[73] Assignee: Hughes Aircraft Company, Culver City, Calif.

[21] Appl. No.: 131,311

[22] Filed: Mar. 18, 1980

[51] Int. Cl.³ .............................................. H01G 13/00
[52] U.S. Cl. ............................ 219/121 ED; 29/25.42; 361/308
[58] Field of Search ........................ 361/308; 29/25.42; 219/121 EC, 121 ED

[56] References Cited

U.S. PATENT DOCUMENTS

| | | | |
|---|---|---|---|
| 2,190,621 | 2/1940 | Baer | 361/308 X |
| 3,067,488 | 12/1962 | Bennett | 29/25.42 |
| 3,132,339 | 5/1964 | Schollhammer | 219/121 ED |
| 3,237,274 | 3/1966 | Kalina | 361/308 X |
| 3,243,675 | 3/1966 | Rayburn | 361/308 |
| 3,267,343 | 8/1966 | Rayburn | 361/308 |

FOREIGN PATENT DOCUMENTS 2541911 3/1977 Fed. Rep. of Germany ...... 361/308

OTHER PUBLICATIONS

Welding Handbook, Sixth Edition, Section Four, AWS, Miami, Fla., 1972, pp. 69.71 & 69.72.
Cary, "Modern Welding Technology", Prentice Hall, N.J., 1979, pp. 233 & 234.

Primary Examiner—Elliot A. Goldberg
Attorney, Agent, or Firm—Allen A. Dicke, Jr.; W. H. MacAllister

[57] ABSTRACT

Wound foil capacitor has one foil wound sheet 28, 30, 32 extending out of the top of wound capacitor body 14 and has a connector strap 16 attached thereto by electron beam welding. A similar connector strap is electron beam welded to the other capacitor foil extending as wound layers out of the bottom of the body 14.

3 Claims, 4 Drawing Figures 4,301,354

METHOD OF MAKING FOIL TERMINATION FOR A CAPACITOR

The government has rights in this invention pursuant to Contract No. F33615-75-C-2021 of the Department of the Air Force.

BACKGROUND OF THE INVENTION

This invention is directed to a foil termination structure for an extended foil capacitor and a method for making the termination. The capacitor is an extended foil wound capacitor, and the method comprises the electron beam welding of the connector straps to the capacitor foil.

Foil capacitors are produced by winding two separate conductive foil layers insulated from each other. These foil layers must be electrically connected to terminals to electrically utilize the capacitor. In extended foil construction, the foil windings extend past opposite ends of the insulating layers to provide for connection. Connector straps are used in some such constructions. In the past, such connector straps have been attached to the foil layers by flame spraying of an electrically conductive bonding material, but such raises problems. Similarly, aluminum or tin-lead soldering of the foil to the connector has been tried, but both of these methods have a great potential for particulate contamination. The soldering requires corrosive flux which presents problems of cleaning and contamination, and the heat required tends to damage the capacitor insulation. Accordingly, to maximize performance and reliability, new methods are required.

SUMMARY OF THE INVENTION

In order to aid in the understanding of this invention, it can be stated in essentially summary form that it is directed to an extended foil wound capacitor having connector straps electron beam welded onto the foil, and to the method of electron beam welding the straps onto the capacitor foil.

It is thus an object of this invention to provide both a foil termination on structure for an extended foil capacitor and a method of making the termination wherein improved reliability is predicted. It is a further object to provide a foil wound capacitor wherein the connector strap is electron beam welded onto the foil, together with the method of electron beam welding the connector strap onto the foil. It is a further object to provide a capacitor construction method particularly useful in large power capacitors.

Other objects and advantages of this invention will become apparent from a study of the following portion of this specification, the claims and the attached drawings.

DETAILED DESCRIPTION OF THE PREFERRED EMBODIMENTS

Figure 1:
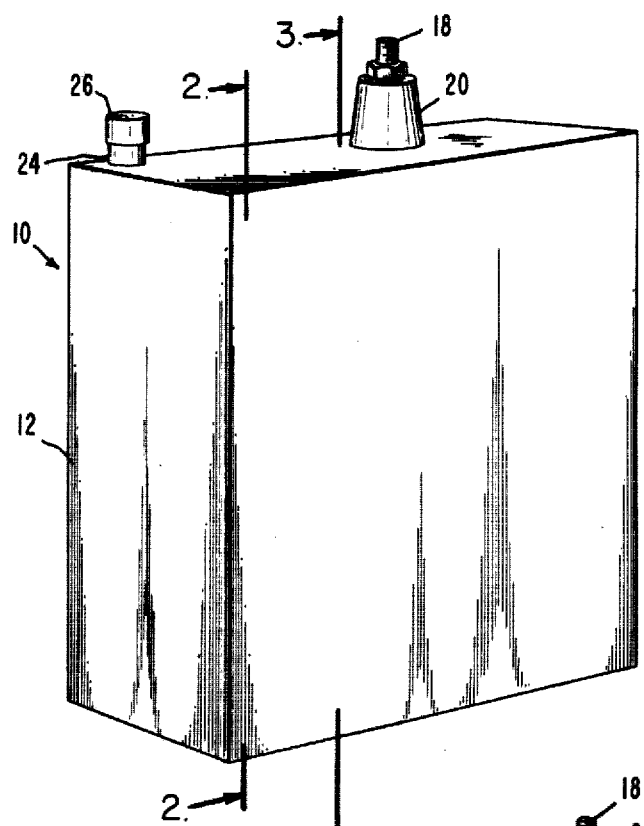
FIG. 1 is a perspective view of a capacitor made in accordance with a method of this invention.
Figure 2:
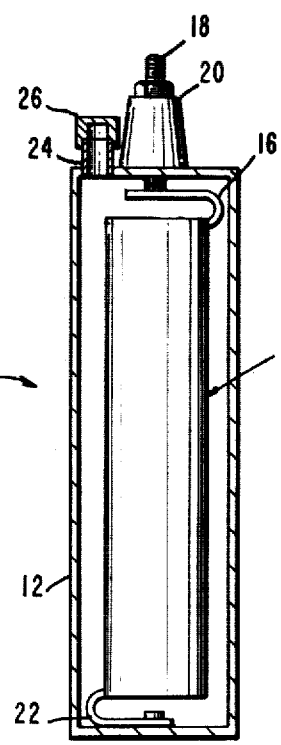
FIG. 2 is a section taken generally along line 2—2 of FIG. 1.

The capacitor of this invention is generally indicated at 10 in FIGS. 1 and 2. It comprises a housing or case 12 which is closed and contains the wound capacitor body 14.

As shown in FIG. 2, upper connector strap 16 connects to terminal post 18 which extends out of insulator bushing 20. The other connector strap 22 on the capacitor body is the lower strap and it connects one side of the capacitor winding to the case 12, although if a grounded case were not preferred, it could connect that side of the winding to another terminal post. Case 12 is totally enclosed and it is equipped with fill neck 24 having cap 26 which permits control of the environment within case 12. The case houses and protects the wound body and provides for electrical connections thereto.

Figure 3:
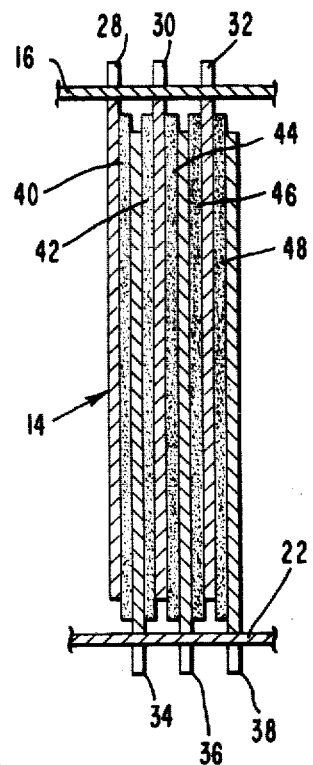
FIG. 3 is a section taken generally along line 3—3 of FIG. 1, with parts broken away, to show the details of the attachment of the connector straps.
Figure 4:
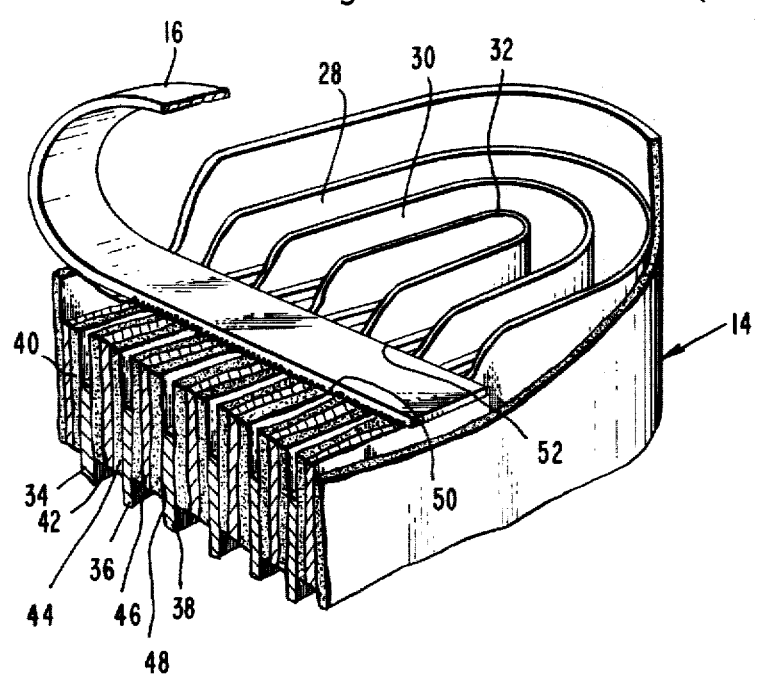
FIG. 4 is an enlarged perspective view, with parts broken away, showing the details of attachment of one of the connector straps.

As seen in FIG. 3, wound capacitor body 14 comprises a plurality of foil layers 28, 30 and 32 which extend out of the top of the body, and a plurality foil layers 34, 36 and 38 which extend out of the bottom of the wound body. These are layers of metallic foil, such as aluminum for light-weight and low electrical resistivity. The foil layers are separated from each other by insulator layers, with insulator layer 40 positioned between winding layers 28 and 34, insulator layer 42 positioned between layers 30 and 34, insulator layer 44 positioned between layers 30 and 36, insulator layer 46 positioned between winding layers 36 and 32 and insulating layer 46 positioned between winding layers 32 and 38. Each insulating layer is made of a plurality of thin paper and plastic sheets or films. As the body 14 is wound, the lateral arrangement of the layers is made so that the upper foil winding sheet is positioned to extend out of the top of the finished winding body, the insulating layers are positioned in the center to lap over the short ends of both of the foil windings, and the lower foil winding layers are positioned to extend out of the bottom of the wound body. Thus, the layers 28, 30 and 32 are all the same sheet of material in successive winding layers of the body. Similarly, foil layers 34, 36 and 38 are the same sheet of material in successive winding layers of the body. FIG. 4 illustrates a body 14 which is generally rectangular with rounded ends, although a cylindrical structure could alternately be provided.

In the preferred embodiment, the foil layers are aluminum and the straps 16 and 22 are also of aluminum. The connector straps are crushed down into the extended ends of the foil layers, with strap 16 crushed down into the upper foil layers and the strap 22 crushed upward into the lower foil layers. After the connector straps are crushed into the foil, then each respective set of foil layers is connected to its respective connector strap by electron beam welding. Electron beam welding of the crushed foil to the edges of the connector straps is accomplished to provide a foil to connector bond which is free of inclusions and contamination. In the preferred embodiment, the foil and the connector straps are both of aluminum and when electron beam welded they are attached together without another kind of material in the joint. The joint becomes a continuous aluminum electrical pathway which is thus not subject to the thermally induced separation forces and corrosion which occur between different types of metal. After all connector straps are electron beam welded, for example, along edges 50 and 52 of upper connector strap 16, then the capacitor body is complete and is ready to be encased. The connector straps are copper plated on the terminal ends to facilitate solder interconnection to terminal 18.

The body may be connected in parallel or series with other capacitor bodies, or may be installed alone in its case 12, as illustrated in FIG. 2. Upon enclosure in its case, the case is closed, evacuated through fill neck 24, and then filled with dielectric oil which greatly increases the dielectric strength of the insulator layers 40-48. In a particular embodiment, wound foil capacitor 10 as shown in FIGS. 2-4 has an active foil area of $6.4 \times 10^4$ square centimeters, with an effective insulating layer thickness of 54.6 micrometers. It has a capacitance of 4.4 microfarads and is rated at 7.5 kilovolts for burst type discharge service.

This invention has been described in its presently contemplated best mode and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. The method of making a foil would capacitor comprising the steps of:
   winding a first aluminum foil sheet, a second aluminum foil sheet and first and second insulator sheets into a wound body so that the first aluminum foil sheet forms upper aluminum foil winding layers which extend out of the top of the body, the second aluminum foil sheet forms lower aluminum foil winding layers which extend out of the bottom of the body and the insulator layers lie between the upper and lower aluminum foil layers to electrically separate the upper and lower aluminum foil layers;
   crushing an upper aluminum connector strap into the upper aluminum foil winding layers;
   electron beam welding in the absence of flux the upper aluminum connector strap to the upper crushed aluminum foil layers where they extend out of the top of the body so that the welded joint is free of contamination and flux;
   crushing a lower aluminum connector strap into the lower aluminum foil winding layers;
   electron beam welding in the absence of flux the lower aluminum connector strap to the lower crushed aluminum foil layers where they extend out of the bottom of the body so that the welded joint is free of contamination and flux.

2. The method of making a foil wound capacitor comprising the steps of:
   winding a first aluminum foil sheet, a second aluminum foil sheet and first and second insulator sheets into a wound body so that the first aluminum foil sheet forms upper aluminum foil winding layers which extend out of the top of the body, the second aluminum foil sheet forms lower aluminum foil winding layers which extend out of the bottom of the body and the insulator layers lie between the upper and lower aluminum foil layers to electrically separate the upper and lower aluminum foil layers;
   crushing an upper aluminum connector strap into the upper aluminum foil winding layers;
   electron beam welding in the absence of flux the upper aluminum connector strap to the upper crushed aluminum foil layers where they extend out of the top of the body after the crushing steps so that the welded joint is free of contamination and flux;
   crushing a lower aluminum connector strap into the lower aluminum foil winding layers; and
   electron beam welding in the absence of flux the lower aluminum connector strap to the lower crushed aluminum foil layers where they extend out of the bottom of the body so that the welded joint is free of contamination and flux.

3. The method of making a foil wound capacitor comprising the steps of:
   winding a first aluminum foil sheet, a second aluminum foil sheet and first and second insulator sheets into a wound body so that the first aluminum foil sheet forms upper aluminum foil winding layers which extend out of the top of the body, the second aluminum foil sheet forms lower aluminum foil winding layers which extend out of the bottom of the body and the insulator layers lie between the upper and lower aluminum foil layers to electrically separate the upper and lower aluminum foil layers;
   crushing an aluminum connector strap into the upper aluminum foil winding layers;
   electron beam welding in the absence of flux the upper aluminum connector strap to the upper crushed aluminum foil layers where they extend out of the top of the body so that the welded joint is free of contamination and flux;
   crushing a lower aluminum connector strap into the lower aluminum foil winding layers;
   electron beam welding in the absence of flux the lower aluminum connector strap to the lower crushed aluminum foil layers where they extend out of the bottom of the body so that the welded joint is free of contamination and flux;
   encasing the capacitor winding body;
   drawing a vacuum thereon to withdraw air from the winding and from the case; and
   thereafter filling the case with dielectric fluid.

* * * * *